(12) United States Patent
Cervello et al.

(10) Patent No.: US 9,533,529 B2
(45) Date of Patent: Jan. 3, 2017

(54) RAILWAY WHEEL AND RESPECTIVE DAMPING ELEMENT

(71) Applicant: LUCCHINI RS S.P.A., Lovere (IT)

(72) Inventors: Steven Cervello, Lovere (IT); Dimitri Sala, Lovere (IT)

(73) Assignee: LUCCHINI RS S.P.A., Lovere (BG) (IT)

( * ) Notice: Subject to any disclaimer, the term of this patent is extended or adjusted under 35 U.S.C. 154(b) by 0 days.

(21) Appl. No.: 14/418,385

(22) PCT Filed: Jul. 29, 2013

(86) PCT No.: PCT/IB2013/056221
§ 371 (c)(1),
(2) Date: Jan. 29, 2015

(87) PCT Pub. No.: WO2014/020521
PCT Pub. Date: Feb. 6, 2014

(65) Prior Publication Data
US 2015/0151571 A1    Jun. 4, 2015

(30) Foreign Application Priority Data

Jul. 30, 2012  (IT) .............................. BS2012A0124

(51) Int. Cl.
*B60B 17/00* (2006.01)

(52) U.S. Cl.
CPC ....... *B60B 17/0034* (2013.01); *B60B 17/0037* (2013.01); *B60B 17/0055* (2013.01);
(Continued)

(58) Field of Classification Search
CPC ............. B60B 17/0034; B60B 17/0037; B60B 17/0041; B60B 17/0044; B60B 17/0048
(Continued)

(56) References Cited

U.S. PATENT DOCUMENTS

| 97,407 | A | * | 11/1869 | Hunt | ............................... 295/11 |
| 181,854 | A | * | 9/1876 | LeMay | ........................... 295/22 |

(Continued)

FOREIGN PATENT DOCUMENTS

| DE | 845961 C | 8/1952 |
| DE | 3245775 C1 | 4/1984 |

(Continued)

*Primary Examiner* — Kip T Kotter
(74) *Attorney, Agent, or Firm* — Volpe and Koenig, P.C.

(57) ABSTRACT

A railway wheel includes a rotation axis and a supporting disk which can be attachable on an axle at the rotation axis. The supporting disk can be coupled with a wheel rim for rolling on a rail. The wheel provides damping means of the rim with respect to the supporting disk which include elastic elements interposed between the disk and the rim, aside with respect to the median plane of the wheel. Each elastic element has its own geometrical axis and includes a first face facing the median plane of the wheel and a second face opposed thereto and facing the opposite part with respect to the median plane of the wheel, so that the elastic element extends its thickness between the two faces. The first and second faces of each elastic element have the same concavity or convexity when considered in cross section in any plane containing the geometrical axis.

25 Claims, 7 Drawing Sheets

(52) U.S. Cl.
CPC ..... *B60B 17/0068* (2013.01); *B60B 2310/318* (2013.01); *B60B 2900/113* (2013.01); *B60B 2900/313* (2013.01)

(58) Field of Classification Search
USPC ........................................ 295/11, 12, 13, 14
See application file for complete search history.

(56) References Cited

U.S. PATENT DOCUMENTS

| | | | |
|---|---|---|---|
| 1,067,628 A | | 7/1913 | Wilke |
| 2,204,953 A | * | 6/1940 | Wittmer ........................ 295/11 |
| 2,252,335 A | * | 8/1941 | Steward ........................ 295/11 |
| 2,263,884 A | * | 11/1941 | Malmquist ..................... 295/11 |
| 2,511,279 A | * | 6/1950 | Malmquist ..................... 295/11 |
| 2,534,981 A | * | 12/1950 | Malmquist ..................... 464/83 |
| 2,548,839 A | * | 4/1951 | Coombes ....................... 295/11 |
| 2,555,023 A | | 5/1951 | Boschi |
| 2,911,252 A | | 11/1959 | Templeton |
| 5,183,306 A | | 2/1993 | Emilsson |
| 7,735,888 B2 | * | 6/2010 | Murawa et al. ................ 295/11 |

FOREIGN PATENT DOCUMENTS

| | | |
|---|---|---|
| EP | 745493 A1 | 12/1996 |
| EP | 1362715 A2 | 11/2003 |
| FR | 2150532 A1 | 4/1973 |
| GB | 374819 A | 6/1932 |
| GB | 888004 A | 1/1962 |

\* cited by examiner

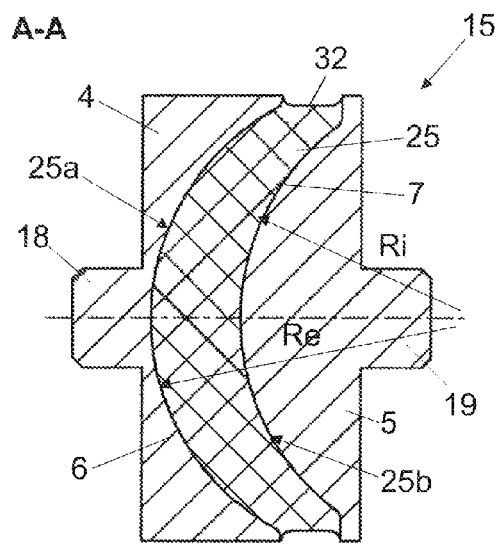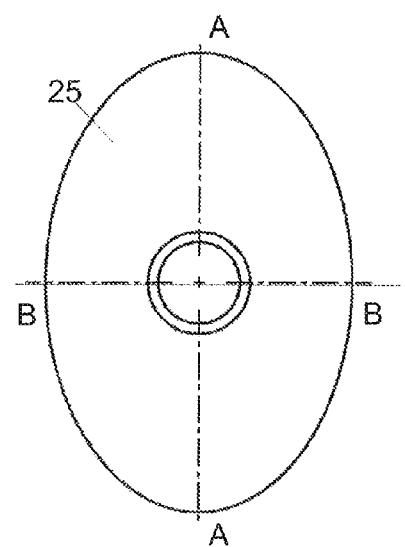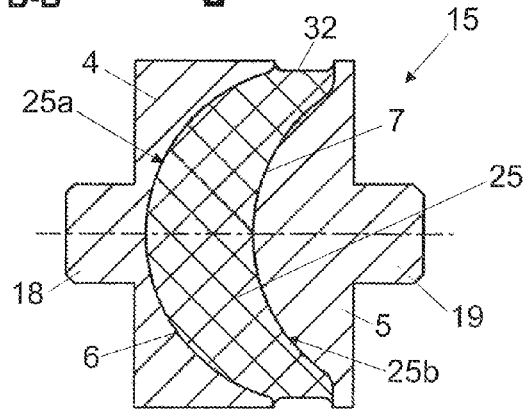

RAILWAY WHEEL AND RESPECTIVE DAMPING ELEMENT

SCOPE OF THE INVENTION

The present invention relates to the field of light railway vehicles, such as for example trams and subways, and, in particular, it refers to a railway wheel for a railway rolling member.

Furthermore, the invention relates to a damping element for said railway wheel.

STATE OF THE ART

As well known, a railway wheel of a railway vehicle structurally comprises two main elements: a central supporting disk, also called wheel center, and a wheel rim. The wheel rim is usually keyed on the supporting disk so as to circumferentially cover it and acts as an element contacting the rail.

In particular, the wheels of a same axis are rigidly coupled one to another at the respective central supporting disks by means of an axle, to form the so called wheel set.

In the railway vehicles the wheel sets are usually damped, i.e. between the axle and the respective carriage dampers are provided and adapted to damp the oscillations induced by the pathway irregularities. The dampers have not-negligible bulks and therefore corresponding housing seats have to be provided between the carriages and the respective wheel sets; therefore the clearance between the rails and the carriages is usually significant.

However in some circumstances it is necessary to minimize such a clearance, that is to say making the carriages as close to the soil as possible to facilitate the getting on and off of the passengers, also from pedestrian platforms. It is for example the case of subways and trams.

In the fields in which a lowered setting of the carriages is provided, the housing seats of the dampers have been reduced to the minimum. The dampers used in these circumstances are often undersized and the vehicle is provided with further damping systems.

One of the known solutions consists in providing the same wheels with damping systems. For example, with the term "elastic wheel", a railway wheel comprising suitable damping means between the supporting disk and the wheel rim is meant. Such means are usually represented by an elastic element, for example made of hard rubber, having the aim of absorbing the vibrations generated by the rolling on the rail.

More in particular, the elastic element is interposed between the supporting disk and the wheel rim, such as to create an interface damping the stresses to which it is subjected.

A well known technical problem afflicting such solutions consists in the quick wear to which the elastic element is subjected; the excessive wear compromises the correct and reliable operation thereof during time and causes the insufficient support of the wheel rim with respect to the central supporting disk. Therefore the drawback affects the wear itself of the wheel rim and the other components of the wheel. In its turn an excessive wear of the wheel rim has to be absolutely avoided since it can compromise the correct wheel-rail coupling. Of course the early removal and replacement of the wheel rim negatively affects the maintenance costs of the vehicle.

In particular, different geometries of the elastic element are known.

For example, in GB 374819 a railway wheel provided with an elastic element with circular geometry, adapted to substantially damp compressive loads only, is provided. Further examples of elastic wheels are described also in U.S. Pat. No. 1,067,628 and EP 1362715.

In this configuration the elastic element is subjected to friction which causes the overheating thereof. As time goes by, the rubber loses its mechanical features, i.e. it collapses, and does not play anymore its damping function. In other configurations the elastic element is adapted to damp almost exclusively bending stresses; for example GB 888004 describes a wheel whose elastic elements are substantially flat and tangential to the supporting disk.

In a further typology the elastic element is adapted to damp shearing stresses; for example U.S. Pat. No. 2,555,023 describes a wheel provided with elastic elements shaped as radial slices.

Therefore in the afore said solutions the elastic element plays a specific damping function for a determined load typology: compression, bending or shearing. Therefore a rapid wear of the elastic element along load directions different from those for which it has been designed can be found.

Wheels provided with elastic elements able to damp various loads have been further proposed. An example is described in EP 745493. The elastic element is substantially shaped as a cord with concave shape straddled on an inner edge of the wheel rim facing the supporting disk. This solution allows damping both compressive and shearing loads, but it becomes complex; in particular the installation and replacement of so-shaped elastic elements are inconvenient. A further example is described in U.S. Pat. No. 5,183,306.

Other wheels known to the art having various damping systems provide, on the other hand, the employ of a flexible element composed of a number of articulated "mechanisms", such as in DE 3245775. However these solutions are complex.

DE 845961 describes a railway wheel comprising a supporting disk which can be attached on an axle at the rotation axis of the wheel and a wheel rim which can be combined to the supporting disk at a respective perimetrical surface, where the wheel rim is adapted to roll on a rail. The supporting disk is separated in two different portions (references 3 and 4 in figures) between which elastic elements (reference 8) are interposed for a damped support. The elastic elements are spaced apart in circumferential direction and each comprises two rubber rings opposed with respect to the median plane of the railway wheel. The rubber rings have the main geometrical axis parallel to the rotation axis of the wheel. Considering any cross section ideally obtained by cutting the elastic elements with a plane passing through the respective main geometrical axis, i.e. by observing the section shown in FIG. 1 of DE 845961, each rubber ring comprises two opposed side surfaces both facing the inside of the ring itself (surfaces 19 and respective opposed surfaces; surfaces 20 and respective opposed surfaces). In other words one of the side surfaces of each rubber ring is concave and the other convex so as to be facing the inside of the ring.

A solution similar to the previous one is described in U.S. Pat. No. 2,511,279. Also in this case the elastic elements (reference 1 in FIG. 1) comprise rubber disks (references 1 and 2) opposed with respect to the median plane of the wheel. Each rubber disk has in its turn two opposed side surfaces (references 3 and 4) both curved towards the inside of the disk, i.e. one is concave and the other is convex.

FR 2150532 describes a solution wherein the elastic elements each comprise two rubber disks opposed with respect to the median plane of the railway wheel. The disks are attached on the same main axis parallel to the rotation axis of the railway wheel. The outer surface of each rubber disk is corrugated to allow the disk itself to contract and extend, as a spring, in order to absorb as much as possible the forces acting on the wheel rim of the railway wheel and not transmit them to the supporting disk. FIGS. 2 and 3 show the compressed configuration and the extended configuration of one of the rubber disks, respectively. In the compressed configuration the side surfaces (reference 8) of each rubber disk converge towards the main axis. For this solution the concavity of the side surfaces of the rubber disks can not be considered since these are intentionally corrugated surfaces whose function is to second the compression and extension of the disk itself which would be therefore considered as having substantially flat side surfaces as shown in a rest condition in FIG. 1.

U.S. Pat. No. 2,911,252 describes a conventional elastic wheel wherein a single elastic element is interposed between the supporting disk and the wheel rim of the railway wheel and not a plurality of separate and circumferentially spaced apart elastic elements.

In general there is the need of having wheels provided with elastic elements able to support various loads without undergoing excessive wear and which are, at the same time, easy to implement, install, and if necessary, replace.

SUMMARY OF THE INVENTION

It is therefore an object of the present invention to provide a railway wheel provided with damping elements able to effectively support various loads, i.e. damping the stresses to which the carriage is subjected due to the transit on rails, offering the maximum wear resistance and easiness of implementation and replacement.

It is an object as well of the present invention to provide a railway wheel provided with damping elastic elements and arranged for obtaining an uniform distribution of the loads according to the strains the wheel is subjected to.

It is a further object of the present invention to provide a railway wheel structure which allows to adjust or modify the stiffness parameters as a function of the application and the type of vehicle it is intended for.

It is still object of the present invention to provide a railway wheel structure which is easy to disassemble and assemble, for example, for maintenance operations.

A further object of the present invention is to provide a railway wheel structure which allows to reduce the acoustic emissions in a railway/tram vehicle.

Another object of the present invention is to provide a damping element—adapted to be inserted in said railway wheel structure—which does not undergo to a quick deterioration and allows to decrease acoustic emissions and wheel vibrations.

These and other objects are obtained by a railway wheel comprising:
 a rotation axis;
 a supporting disk attachable on an axle at said rotation axis;
 a wheel rim which can be combined to the supporting disk at a respective perimetrical surface, said wheel rim being adapted to roll on a rail;
 damping means of the wheel rim with respect to the supporting disk;
 wherein said damping means comprise a plurality of elastic elements interposed between the supporting disk and the wheel rim, aside with respect to the median plane of the railway wheel.

Each elastic element has a geometrical axis and comprises a first face facing the median plane of the wheel and a second face opposed to the first face and facing the opposite part with respect the median plane of the wheel, so that the elastic element develops its thickness between the two faces.

The first face and the second face of each elastic element have the same concavity, or the same convexity, when considered in cross section in any plane containing said geometrical axis.

In other words the two faces of the elastic elements, which correspond to the side surfaces of the above commented solutions according to the known art, are not provided with concavities opposite one to another, as just provided in the known art, but with the same concavity or the same convexity.

Preferably, the geometrical axis is substantially parallel to the rotation axis or else, alternatively, the geometrical axis can be tilted always with respect to the rotation axis.

More preferably the geometrical axis is a symmetry axis of the elastic element.

In other words each elastic element develops along a specific geometry conceived to obtain the effective damping of the compressive, bending and shearing forces and respective combinations thereof. Such a geometry provides the symmetry with respect to the geometrical axis, or symmetry axis as named afterwards, parallel to the rotation axis of the wheel. Considering a bundle of planes containing the symmetry axis of the elastic element, and considering sectioning the elastic element with each of these planes, in all the sections the elastic element is concave or convex. For example, in an embodiment the elastic element is shaped as a bell-shaped hood.

The effective damping of the forces, which can be obtained with the described configuration, allows to decrease noise phenomena and vibrations, such as to make the motion of the wheel and therefore of the railway/tram vehicle on the rail more comfortable. In addition, such a conformation allows to increase the lifetime of each of the elastic elements and therefore of the wheel itself and in particular of the wheel rim, accordingly reducing costs and planned maintenance operations.

Furthermore the described conformation of the elastic element allows to combine a plurality of elastic elements according to particularly advantageous layouts, described hereinafter.

The elastic elements are apart one from another and independent. Preferably the elastic elements are circumferentially distributed around the supporting disk or inside the wheel rim; more preferably the pitch between the elastic elements is constant.

The elastic elements are made of a resilient material, for example rubber. Preferably they are made of EPDM (Ethylene-Propylene Diene Monomer) rubber.

Advantageously, by modifying the curvature and the thickness of the elastic elements, or else adopting materials characterized by different elastic modules, the wheel stiffness is modified consequently; in this way the wheel can be adapted to the specific application field it is intended for.

Preferably each elastic element is axially symmetrical with respect to the geometrical axis. In practice the two faces can be both concave, or else both convex, meaning that the concavity direction is the same for both faces. In other embodiments one of the faces is concave or convex and the other is at most substantially flat.

The radius of curvature of the two faces can be the same or different. In the first circumstance the thickness of the elastic element is substantially constant. In the second circumstance the thickness of the elastic element is reduced or incremented at the respective perimetrical portion.

At most the elastic element can have a substantially conical shape.

In the preferred embodiment of the present invention the profile of each elastic element, always considered sectioned on a plane containing the symmetry axis, is elliptical.

In an embodiment each elastic element comprises additional portions, plane too, which radially extend from the faces.

Advantageously, each elastic element is interposed between a first and a second supporting element, preferably both made of metal, opposed one to another along the symmetry axis of said elastic element so that to form a damping plug.

Preferably, the first supporting element comprises a first surface coupling with the first face of the corresponding elastic element. The first coupling surface has a complementary shape with respect to the first face of the elastic element to realize a shape coupling. Similarly, the second supporting element comprises a second surface coupling with the second face of the elastic element. The second coupling surface has a complementary shape with respect to the second face of the elastic element.

Preferably the supporting elements are made of steel.

Preferably the first and second coupling surface contact directly the corresponding first and second face of the elastic element. More preferably the elastic element is made of rubber vulcanized directly on the supporting elements.

Constructively, in a preferred embodiment, each damping plug has a substantially cylindrical shape. In particular, preferably the damping plug has a straight cylindrical shape, with a height comprised between 15 mm and 40 mm and radius comprised between 10 mm and 40 mm, more preferably a height of about 25 mm and a radius of about 20 mm.

Preferably the pitch between the plugs is minimal, meaning that they are arranged adjacent one to another along the perimeter of the supporting disk, with a minimum gap, so that the central angle defined by two adjacent plugs is preferably comprised between 12° and 20°.

Advantageously this configuration allows to uniformly distribute the loads between all the plugs. For example the vertical, i.e. compressive, loads acting on the wheel due to the weight of the respective carriage, are equally distributed among all plugs, independently from the relative position with respect to the rotation axis of the wheel itself. This holds true for the bending and shearing loads as well; in other words if n is the number of wheel plugs, the compressive and/or bending and/or shearing load effectively supported by each plug corresponds to the fraction 1/n.

In particular, the wheel rim comprises a leading edge radially extending towards the rotation axis, i.e. towards the perimetrical surface of the supporting disk. The damping plugs are prearranged at least at one side of the leading edge and preferably at both sides, i.e. the side facing the other wheel of the same wheel set and the side facing the outside of the railway vehicle.

Preferably the plugs are constrained to the leading edge of the wheel rim two by two opposed from opposed parts with respect to the same leading edge. More preferably the plugs are symmetrically prearranged with respect to the median plane of the wheel.

Preferably the supporting elements of each plug are provided with a first pin engaging a corresponding through or blind hole, obtained in the leading edge of the wheel rim and a second pin, opposed to the first pin along the symmetry axis of the plug, which engages a corresponding through or blind hole, obtained in the supporting disk.

In an alternative embodiment the plugs prearranged on a side of the leading edge of the wheel rim are angularly offset with respect to the plugs prearranged on the opposite side of the leading edge.

Preferably the supporting disk comprises a first and a second disk portions, for example two half-disks, which can be coupled one to another, for example at the median plane of the wheel, by detachable attaching means, in particular screws, pins, direct coupling by thread or the like. The two joined disk portions embrace at least partially the leading edge of the wheel rim with the interposition of the damping plugs.

This solution allows to easily replace the damping plugs by simply removing the attaching means joining the two disk portions of the supporting disk. By disassembling the supporting disk, in fact, the plugs can be accessed which can be individually removed and replaced, if necessary.

Another independent aspect of the invention relates to an elastic element which can be interposed between the central supporting disk and the wheel rim of a railway wheel. The elastic element comprises a geometrical axis, preferably a symmetry axis substantially parallel to the rotation axis of the corresponding wheel, and at least one portion whose section, considered in any plane containing said geometrical axis, is concave or convex.

LIST OF THE FIGURES

Further characteristics and advantages of the present invention will be more evident from a review of the following specification of a preferred, but not exclusive, embodiment, shown for illustration purposes only and without limitation, with the aid of the attached drawings, in which.

Figure 1:
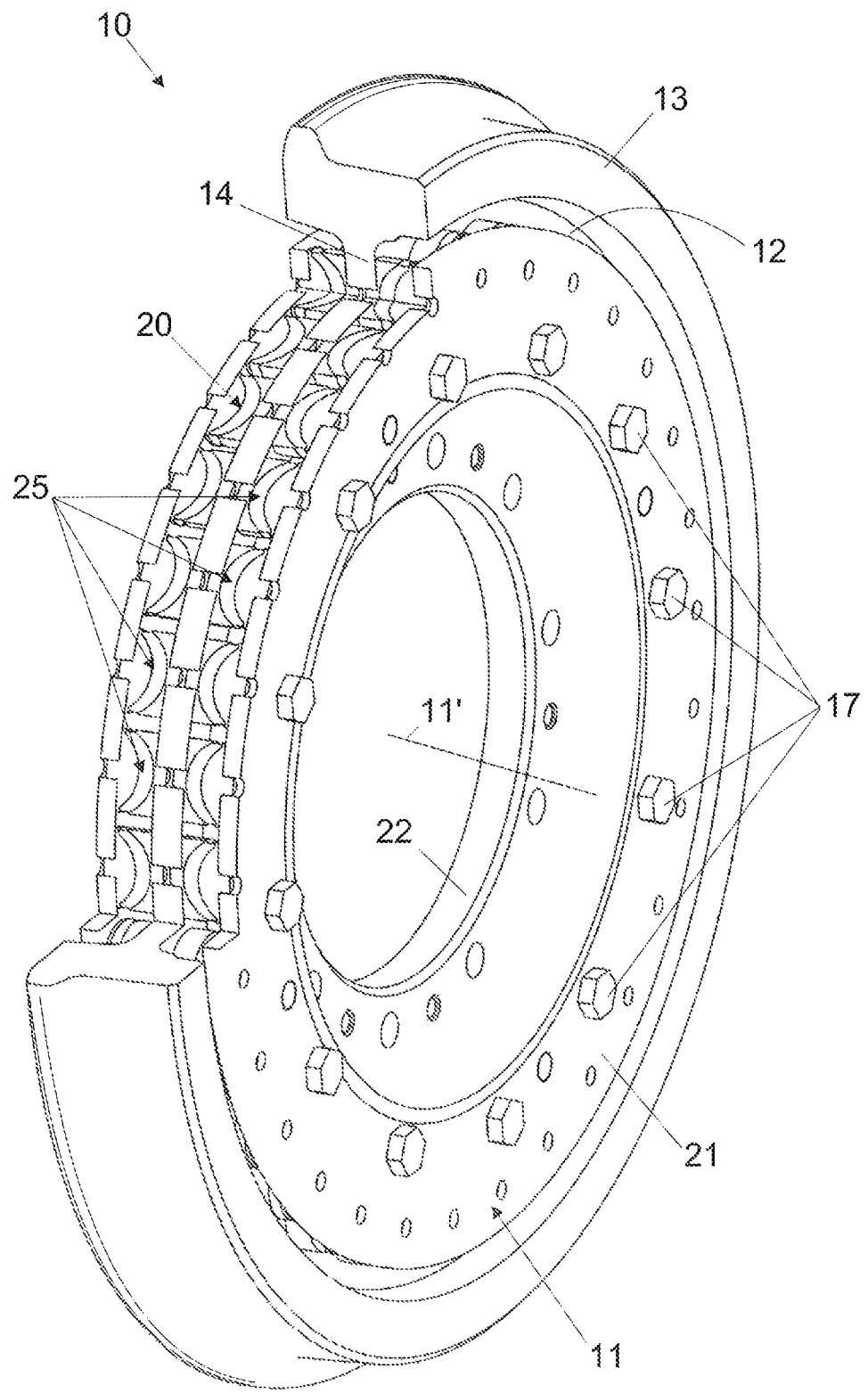
FIG. 1 shows a perspective and partially sectional view of a railway wheel, according to the invention, comprising a plurality of elastic elements prearranged between a supporting disk and a wheel rim.
Figure 2:
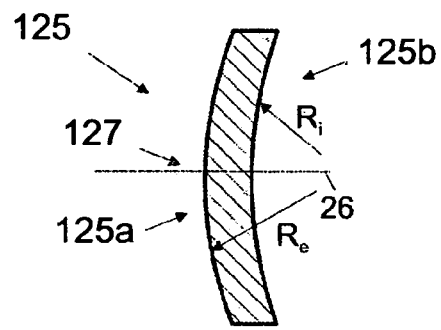
Figure 2A:
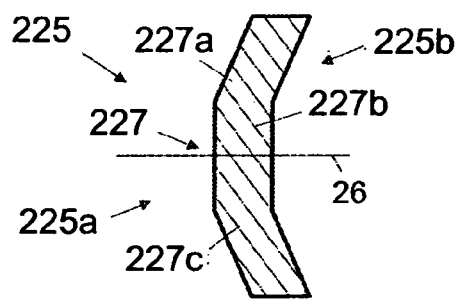
Figure 2B:
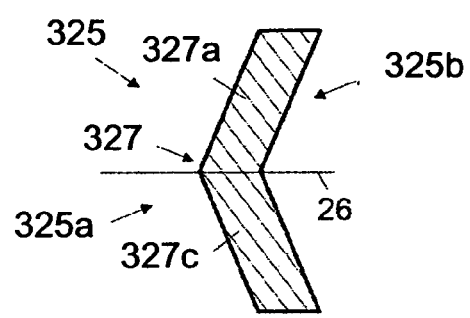
Figure 2C:
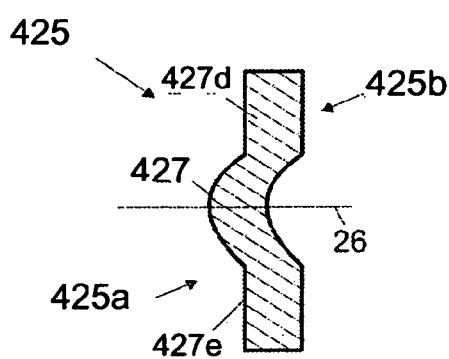
Figure 2D:
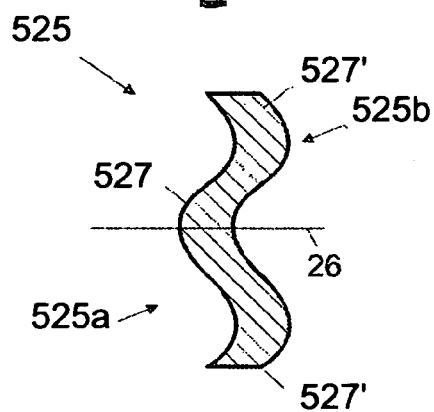
Figure 2E:
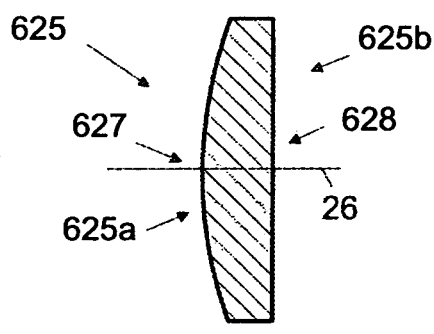
Figure 2F:
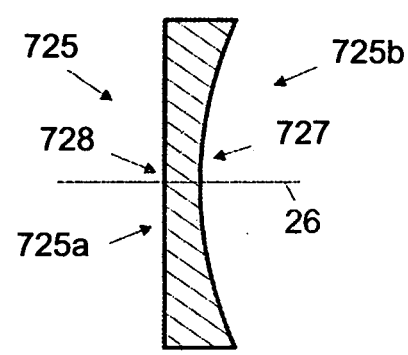
Figure 4:
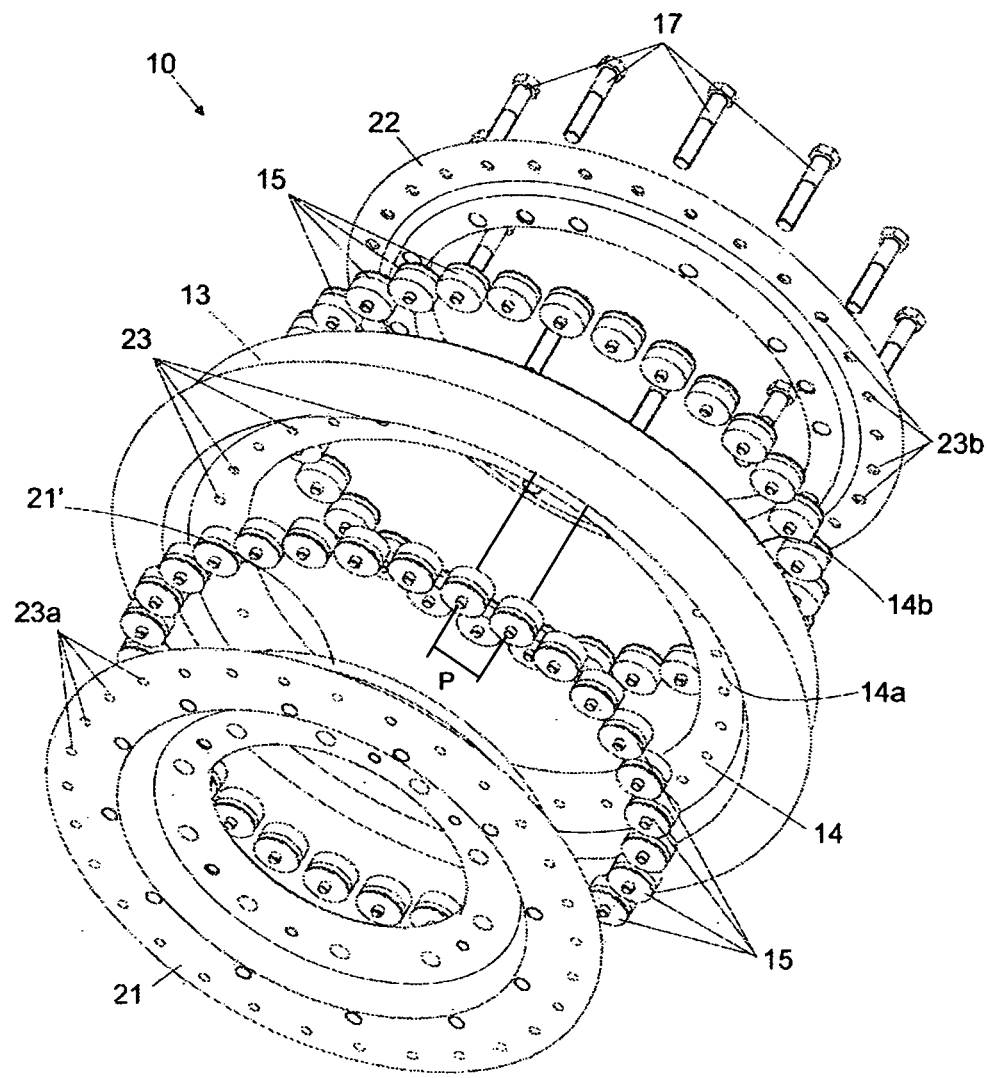

FIGS. 2 to 2F schematically show sections of other possible variations of the elastic element;

FIGS. 3 and 3A show a detailed sectional view of a damping plug according to the present invention;

FIG. 3B shows a top view of the plug shown in FIGS. 3 and 3A;

FIG. 4 shows an exploded perspective view of the railway wheel shown in FIG. 1.

DETAILED DESCRIPTION OF THE INVENTION

Figure 1A:
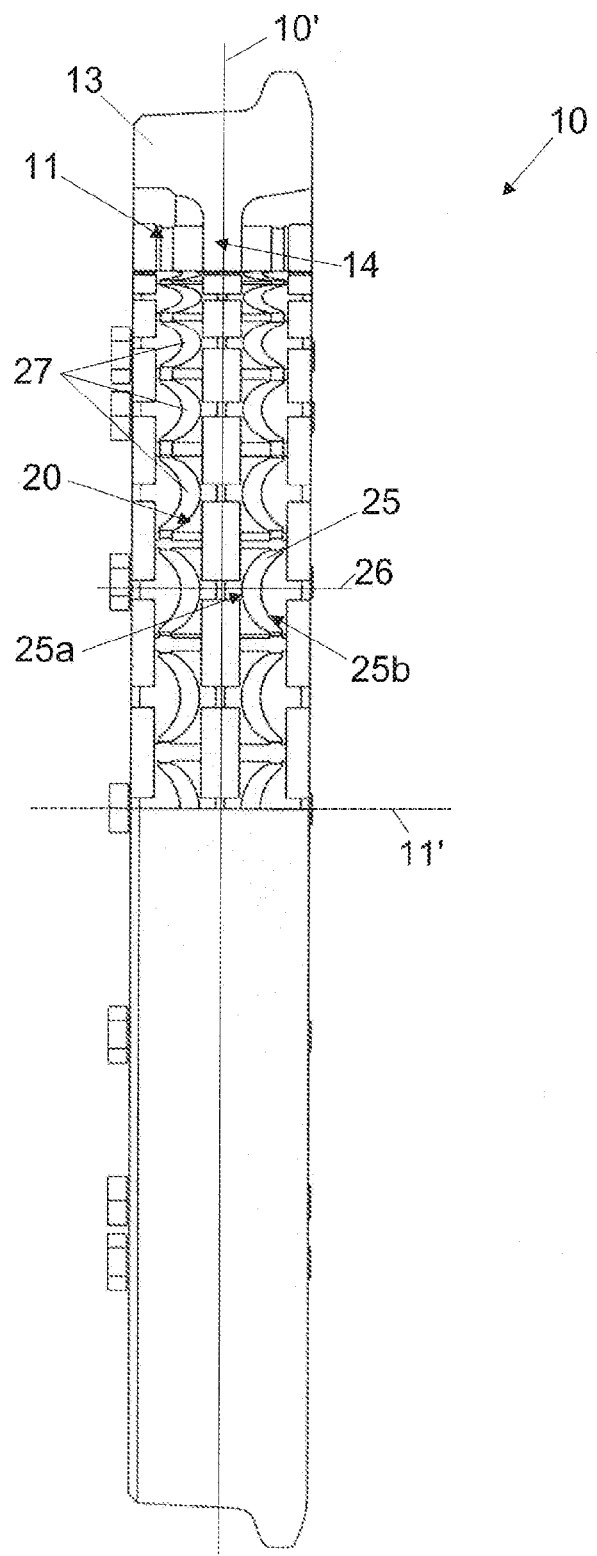
FIG. 1A shows a front and partially sectional view of the railway wheel of FIG. 1, which highlights the geometry of the elastic element consisting of at least one concave or convex portion.

Referring to FIGS. 1, 1A and 4, a wheel 10 is represented for a railway vehicle, in particular a light vehicle such as, for example, a subway, a tram, etc.

The railway wheel 10 comprises a rotation axis 11' and a supporting disk or wheel center 11 which can be attached on an axle (not shown), for example which can be keyed, at the rotating axis 11'. In particular, the supporting disk 11 has an outer perimetrical surface 12 (FIG. 4), which can be combined with a wheel rim 13; the wheel rim 13 acts as a contacting element with a rail (not shown) on which it moves with rotary motion.

Damping means 20 of the wheel rim 13 with respect to the supporting disk 11 are further provided.

In particular, the damping means 20 comprise a plurality of elastic elements 25 interposed between the supporting disk 11 and the wheel rim 13.

In FIG. 1A each elastic element 25 has a geometrical axis 26. Such a geometrical axis 26 is substantially parallel to the rotation axis 11' of the supporting disk 11. Alternatively, in a not shown way, the geometrical axis 26 can be tilted with respect to the rotation axis 11' as well.

More in particular, as better shown in FIG. 1A, at least one portion 27 of each elastic element 25, for example a central portion, is provided with a curved, concave or convex profile, in a section considered in any plane, for example A-A or B-B (FIGS. 3 and 3A) containing the geometrical axis 26. In other words, each elastic element 25 is provided with at least one concave or convex portion 27 conceived for obtaining the effective damping of any stress, whether it is a compressive, bending, shearing stress or respective combination thereof.

Preferably, the geometrical axis 26 is a symmetry axis for which the concave or convex portion 27 is axially symmetrical with respect to the symmetry axis 26. In other words, considering a bundle of planes containing such a geometrical axis 26, in the case represented in figures a symmetry axis, and considering the elastic element 25 to be sectioned with each of these planes, the afore said portion 27 becomes concave or convex in all sections. For example, in a preferred embodiment, as better described in the following, the elastic element 25 is shaped as a half-spherical bell hood (FIG. 3B) or substantially the like.

Still as shown in FIGS. 1 and 1A, the elastic elements 25 are circumferentially distributed around the supporting disk 11 or inside the wheel rim 13 and are separated and independent one from another. In particular, a preferred circumferential distribution provides the elastic elements 25 spaced apart one from another according to a constant pitch P.

Furthermore the same conformation of the elastic element 25 allows to combine a plurality of elastic elements according to particularly advantageous layouts as described in the following referring to FIG. 4.

Preferably, the elastic elements 25 are made of ethylene-polypropylene-based rubber.

More in particular, each elastic element 25 develops between a first face 25a facing a median plane 10' of the wheel 10 and a second face 25b opposed to the first face 25a. In practice the two faces 25a, 25b can be both concave, or else both convex, meaning that the concavity direction is the same for both faces.

Figure 1B:
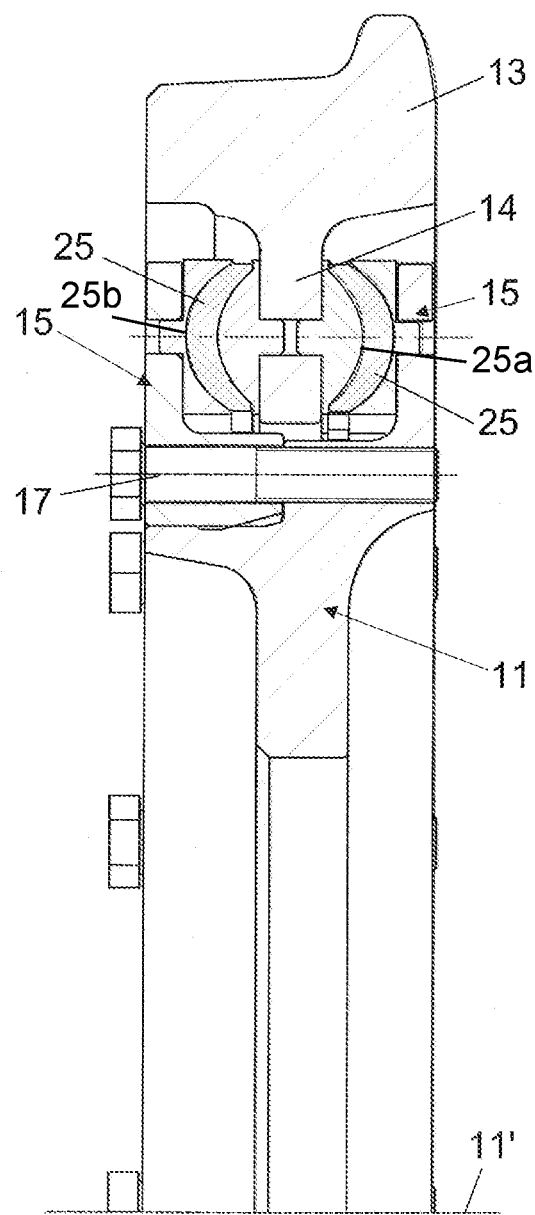
FIG. 1B shows a front and partially sectional view of a variation of the railway wheel according to the present invention.

Alternatively again, as shown in FIG. 1B, the elastic element 25 is prearranged in an opposite direction with respect to the version shown in FIG. 1A, i.e. the second face 25b is facing the median plane 10' of the wheel, whereas the first face 25a is facing the opposite part with respect to the second face 25b.

According to different embodiments, the elastic element 25 can be realized as schematically shown in FIGS. 2 to 2F. In all the afore said embodiments the elastic element 25 is, as said above, axially symmetrical with respect to its own symmetry axis 26 and is depicted in a section defined by any plane containing the symmetry axis 26.

In the embodiment of FIG. 2, the elastic element 125 has a substantially curved profile of both faces 125a, 125b, in particular elliptic, which defines the concave or convex portion 127. The radius of curvature $R_i$ and $R_e$ of the two faces 125a, 125b can be equal or else different (FIG. 3). In the first circumstance the thickness of the elastic element 125 is substantially constant. In the second circumstance the thickness of the elastic element decreases at the respective radially perimetrical portion.

Alternatively, as shown in FIG. 2A, the elastic element 225 has a substantially polygonal, in particular trapezoidal, profile wherein each face 225a, 225b comprises three corresponding linear lengths 227a, 227b and 227c following one to another which give rise to the portion 227.

In a further alternative, shown in FIG. 2B and deriving from that of FIG. 2A, the elastic element 325 has a triangular profile of the faces 325a, 325b which comprises a first 327a and a second 327c linear length which converge towards one to another so that the elastic element 325 takes a conical conformation.

In FIG. 2C, on the other hand, the elastic element 425, with first and second faces 425a, 425b, has the concave or convex portion 427 having elliptical shape, as that of FIG. 2, combined with further portions 427d and 427e, plane too, which radially extend from the concave or convex portion 27.

In a further variation of the embodiment of FIG. 2D, the elastic element 525 comprises first and second faces 525a, 525b, a concave or convex central portion 527 and additional convex or concave radial portions 527' which extend from said central portion 527. The identified profile is substantially shaped as a double "S" and is axially symmetrical too with respect to the symmetry axis 26.

Further embodiments of the elastic element 625, 725, are shown in FIGS. 2E and 2F. The elastic elements 625, 725 comprise first 625a, 725a and second 625b, 725b faces and can be developed starting from the combination of the concave or convex portion 627, 727 and a substantially planar portion 628, 728 opposite thereto with other elastic portions so that an axially symmetry arises on the whole.

In particular, referring to FIGS. 3 and 3A, each elastic element 25 is interposed between a first supporting element 4 and a second supporting element 5, opposed one to another and along the symmetry axis 26, so that to form a damping plug 15.

More in particular, the first 4 and the second 5 supporting elements respectively comprise a first surface 6 coupling with the first face 25a of the elastic element 25, and a second surface 7 coupling with the second face 25b of the elastic element. Preferably, the first 6 and the second 7 coupling surfaces are complementary with respect to the first 25a and the second 25b faces of the elastic element 25 to form a shape coupling. In this way, the first and the second coupling surfaces 6, 7 are directly contacting with the corresponding first and second faces 25a, 25b of the elastic element 25.

In the afore said configuration, the supporting portions 4, 5 are preferably metal portions, in particular they are made of stainless steel and the elastic element 25 is made of rubber vulcanized directly on the coupling surfaces 6, 7 of the supporting elements 4, 5.

In addition, the elastic element 25 interposed between the first 4 and second 5 supporting elements comprises a peripheral recess 32 adapted to improve the fatigue resistance of the elastic element itself at the connection with the supporting elements 4 and 5. The connection of the peripheral recess 32 is of asymptotic type to the surface of the supporting elements 4 and 5, as shown in detail from FIG. 3C.

Concerning the structure, each damping plug 15 has preferably bulks in height comprised between 15 mm and 40 mm and is preferably cylindrical, with a radius comprised between 10 mm and 40 mm. In figures the damping plug 15 has a height of about 25 mm and a radius of about 20 mm.

Referring to FIG. 4, a preferred embodiment of the wheel 10 is shown, wherein a plurality of damping plugs 15 are provided as circumferentially distributed around the supporting disk 11.

Preferably, the pitch P between the damping plugs 15 is substantially equal or slightly larger than the outer diameter of each plug 15 so that each plug is substantially in contact with, or minimally spaced apart from a corresponding adjacent plug 15. In the embodiment shown in figures, the number of couples of plugs 15 is thirty and therefore the pitch P corresponds to a central angle between two adjacent plugs 15 equal to 12°.

Advantageously this configuration allows to uniformly distribute the loads among all the damping plugs 15 as explained above.

The wheel rim 13 comprises a leading edge 14 radially extending towards the rotation axis 11' of the wheel i.e. towards the perimetrical surface 12 of the supporting disk 11.

The damping plugs 15 are connected to at least one side of the leading edge 14.

In the embodiment shown in figures, the plugs 15 are connected at both sides of the leading edge 14, i.e. the side facing the other wheel of the same wheel set and the side facing the outside of the railway vehicle. In other words, a first and a second series of damping plugs 15 are identified.

Preferably the plugs 15 are constrained to the leading edge 14 of the wheel rim 13 two by two opposed from opposite parts with respect to the same leading edge, so that they share a same symmetry axis 26. More preferably the plugs 15 are symmetrically prearranged with respect to the median plane 10' of the wheel 10.

In particular, as better shown in FIGS. 3 and 3A, the supporting elements 4, 5 of each plug 15 are provided with a first pin 18 engaging a corresponding hole 23 obtained in the leading edge 14 of the wheel rim 13 and a second pin 19, opposed to the first pin 18 which engages a corresponding through or blind hole 23a, 23b, obtained in the supporting disk 11.

Such a damping plug 15 further allows to be indifferently mounted according to two opposite directions, wherein the orientation of the elastic element 25 changes with respect to the leading edge 14. In order to do this, the plug can be inverted so that the first pin 18 is inserted in the hole 23a, 23b of the supporting disk 11, whereas the second pin 19 is inserted in the hole 23 of the leading edge 14. An example of the afore described configurations is shown referring to FIGS. 1A and 1B.

In particular, the first 15a and second 15b series of damping plugs 15 provide the corresponding elastic elements 25 symmetrically oriented with respect to the median plane 10' of the wheel 10 (FIGS. 1 and 1A).

In an additional possible arrangement, the plugs 15 of the first and second series can be angularly offset one to another by a predetermined angle, for example to obtain an optimal balance of the wheel 10.

In general all the perimeter of the wheel rim 13 is uniformly rested on the damping plugs 15 and the damping effect is balanced.

Still as shown in FIG. 4, advantageously the supporting disk 11 is composed of a first 21 and a second 22 portions which can be coupled by screws 17.

Alternatively, the two disk portions 21 and 22 can be screwed one to another.

The two joined disk portions 21 and 22 embrace at least partially the leading edge 14 of the wheel rim, leaving a gap in which the damping plugs 15 are prearranged.

More in particular, the first portion of the disk 21 comprises a supporting portion 21' which extends along the axis 11' of the wheel 10 of a predetermined length so that to substantially constitute the wheel center around which the wheel rim 13 is mounted. Conversely on the other hand, the second portion of the disk is an annular flange 22 which couples to the afore said supporting portion 21' so that to form the supporting disk 11.

The two disk portions are shaped so that to retain the damping plugs 15 one to another. The screws 17 are circumferentially distributed on a connection edge of each portion and are positioned under the damping plugs 15 (FIG. 1A).

This solution allows to easily replace the damping plugs 15 by removing the screws 17 which join the two disk portions 21, 22. By disassembling the supporting disk, in fact, the plugs 15 can be accessed which can be individually removed and replaced, if necessary, or reversely mounted.

The invention claimed is:

1. Railway wheel (10) comprising:
   a rotation axis (11');
   a supporting disk (11) fixable on an axle at said rotation axis (11');
   a wheel rim (13) which can be combined to the supporting disk (11) at a respective perimetrical surface (12), said wheel rim (13) being adapted to roll on a rail;
   damping means (20) of the wheel rim (13) with respect to the supporting disk (11);
   wherein said damping means (20) comprise a plurality of elastic elements (25) interposed between the supporting disk (11) and the wheel rim (13), aside with respect to the median plane (10') of the wheel (10), each elastic element (25) having a geometrical axis (26), and
   wherein each elastic element (25) comprises a first face (25a) facing the median plane (10') of the wheel (10) and a second face (25b) opposed to the first face (25a) and facing the opposite part with respect to the median plane (10') of the wheel, wherein the elastic element (25) extends its thickness between the two faces (25a, 25b), and
   wherein the first face (25a) and the second face (25b) of each elastic element (25) are both concave or both convex when considered in cross section in any plane containing said geometrical axis (26), meaning that a radius of curvature (Ri, Re) of said first face (25a) and said second face (25b) extend from a same side of the elastic element.

2. Railway wheel (10) according to claim 1, wherein the geometrical axis (26) is substantially parallel to the rotation axis (11').

3. Railway wheel (10) according to, claim 1, wherein said geometrical axis (26) is a symmetry axis of each elastic element (25).

4. Railway wheel (10) according to claim 1, wherein said elastic elements (25) are separated one from another and reciprocally independent.

5. Railway wheel (10) according to claim 1, wherein said elastic elements (25) are circumferentially distributed around the supporting disk (11) or inside the wheel rim (13).

6. Railway wheel (10) according to claim 1, wherein said elastic elements (25) are made of a resilient material.

7. Railway wheel (10) according to claim 1, wherein each elastic element (25) is axially symmetrical with respect to said geometrical axis (26).

8. Railway wheel (10) according to claim 7, wherein the radius of curvature (Ri, Re) of the two faces (25a, 25b) of each elastic element (25) is the same, and a thickness of the elastic element (25) is substantially constant, or else is different, and the thickness of the elastic element (25) decreases at the respective radially perimetrical portion.

9. Railway wheel (10) according to claim 7, wherein the elastic element (25) has a substantially conical shape or else it has a bell- or hemispherical-shape.

10. Railway wheel (10) according to claim 1, wherein a profile of each elastic element (25), considered in a section in a plane containing the respective geometrical axis (26), is elliptical.

11. Railway wheel (10) according to claim 1, wherein each elastic element (25) comprises further portions (27d, 27e; 27'), which radially extend from the concave or convex faces (25a, 25b).

12. Railway wheel (10) according to claim 1, wherein each elastic element (25) is interposed between a first (4) and a second (5) supporting element opposed one to another along the geometrical axis (26) of said elastic element (25) so as to form a damping plug (15).

13. Railway wheel (10) according to claim 12, wherein the first supporting element (4) comprises a first surface (6) coupling with the first face (25a) of the corresponding elastic element (25), the first coupling surface (6) having a complementary shape with respect to the first face (25a) of the elastic element (25) to provide a shape coupling, and wherein the second supporting element (5) comprises a second surface (7) coupling with the second face (25b) of the elastic element (25), the second coupling surface (7) having a complementary shape with respect to the second face (25b) of the elastic element (25).

14. Railway wheel (10) according to claim 13, wherein the elastic element (25) is made of rubber vulcanized directly on the coupling surfaces (6, 7) of the first and second supporting element (4, 5).

15. Railway wheel (10) according to claim 12, wherein each damping plug (15) has a substantially cylindrical shape.

16. Railway wheel (10) according to claim 12, wherein a pitch (P) between two adjacent plugs (15) corresponds to a circumferential arc of the wheel rim (13) between 12° and 20°.

17. Railway wheel (10) according to claim 12, wherein the wheel rim (13) comprises a leading edge (14) extending radially towards the rotation axis (11'), and wherein said damping plugs (15) are arranged at least at one side (14a), of the leading edge (14).

18. Railway wheel (10) according to claim 17, wherein the damping plugs (15) are constrained to the leading edge (14) of the wheel rim (13) and are arranged two by two with respect to the same leading edge (14).

19. Railway wheel (10) according to claim 17, wherein the supporting elements (4,5) of each plug are provided with a first pin (18) engaging a corresponding blind or through hole (23), obtained in the leading edge (14) of the wheel rim (13) and with a second pin (19), opposed to the first pin along the geometrical axis (26) of the plug, which engages a corresponding blind or through hole (23a, 23b) obtained in the supporting disk (11).

20. Railway wheel (10) according to claim 17, wherein the supporting disk (11) comprises a first (21) and a second (22) disk portion which can be coupled one to another by detachable attaching means (17), and wherein the two joined disk portions (21, 22) embrace at least partially the leading edge (14) of the wheel rim (13) with the interposition of the damping plugs (15).

21. Elastic element (25) which can be interposed between a central supporting disk (11) and a wheel rim (13) of a railway wheel (10), said elastic element (25) comprises a geometrical axis (26) and extends between a first face (25a) and a second face (25b), and wherein the first face (25a) and the second face (25b) of each elastic element (25) are both concave or both convex when considered in section or in any plane containing said geometrical axis (26) meaning that a radius of curvature (Ri, Re) of said first face (25a) and second face (25b) extend from a same side of the elastic element (25).

22. Railway wheel (10) comprising:
a rotation axis (11');
a supporting disk (11) fixable on an axle at said rotation axis (11');
a wheel rim (13) which can be combined to the supporting disk (11) at a respective perimetrical surface (12), said wheel rim (13) being adapted to roll on a rail;
damping means (20) of the wheel rim (13) with respect to the supporting disk (11);
wherein said damping means (20) comprise a plurality of elastic elements (25) interposed between the supporting disk (11) and the wheel rim (13), aside with respect to the median plane (10') of the wheel (10), each elastic element (25) having a geometrical axis (26), and
wherein each elastic element (25) comprises a first face (25a) facing the median plane (10') of the wheel (10) and a second face (25b) opposed to the first face (25a) and facing the opposite part with respect to the median plane (10') of the wheel, wherein the elastic element (25) extends its thickness between the two faces (25a, 25b), and
wherein the first face (25a) and the second face (25b) of each elastic element (25) are both concave or both convex when considered in cross section in any plane containing said geometrical axis (26), meaning that a center of curvature of said first face (25a) and second face (25b) lies on the same side of the elastic element (25).

23. Railway wheel (10) comprising:
a rotation axis (11');
a supporting disk (11) fixable on an axle at said rotation axis (11');
a wheel rim (13) which can be combined to the supporting disk (11) at a respective perimetrical surface (12), said wheel rim (13) being adapted to roll on a rail;
damping means (20) of the wheel rim (13) with respect to the supporting disk (11);
wherein said damping means (20) comprise a plurality of elastic elements (25) interposed between the supporting disk (11) and the wheel rim (13), aside with respect to the median plane (10') of the wheel (10), each elastic element (25) having a geometrical axis (26), and
wherein each elastic element (25) comprises a first face (25a) facing the median plane (10') of the wheel (10) and a second face (25b) opposed to the first face (25a) and facing the opposite part with respect to the median plane (10') of the wheel, wherein the elastic element (25) extends its thickness between the two faces (25a, 25b), and wherein the first face (25*a*) and the second face (25*b*) of each elastic element (25) are both concave or both convex when considered in cross section in any plane containing said geometrical axis (26), meaning that a center of curvature of said first face (25*a*) and second face (25*b*) lies on said geometrical axis (26) on a same side of the elastic element (25).

24. Railway wheel (10) comprising:

a rotation axis (11');

a supporting disk (11) fixable on an axle at said rotation axis (11');

a wheel rim (13) which can be combined to the supporting disk (11) at a respective perimetrical surface (12), said wheel rim (13) being adapted to roll on a rail;

damping means (20) of the wheel rim (13) with respect to the supporting disk (11);

wherein said damping means (20) comprise a plurality of elastic elements (25) interposed between the supporting disk (11) and the wheel rim (13), aside with respect to the median plane (10') of the wheel (10), each elastic element (25) having a geometrical axis (26), and wherein each elastic element (25) comprises a first face (25*a*) facing the median plane (10') of the wheel (10) and a second face (25*b*) opposed to the first face (25*a*) and facing the opposite part with respect to the median plane (10') of the wheel, wherein the elastic element (25) extends its thickness between the two faces (25*a*, 25*b*), and wherein the first face (25*a*) and the second face (25*b*) of each elastic element (25) are both concave or both convex when considered in cross section in any plane containing said geometrical axis (26), meaning that a radius of curvature ($R_i$, $R_e$) of said first face (25*a*) and second face (25*b*) extend from said geometrical axis (26) on a same side of the elastic element (25).

25. Railway wheel (10) comprising:

a rotation axis (11');

a supporting disk (11) fixable on an axle at said rotation axis (11');

a wheel rim (13) which can be combined to the supporting disk (11) at a respective perimetrical surface (12), said wheel rim (13) being adapted to roll on a rail;

damping means (20) of the wheel rim (13) with respect to the supporting disk (11);

wherein said damping means (20) comprise a plurality of elastic elements (25) interposed between the supporting disk (11) and the wheel rim (13), aside with respect to the median plane (10') of the wheel (10), each elastic element (25) having a geometrical axis (26), and wherein each elastic element (25) comprises a first face (25*a*) facing the median plane (10') of the wheel (10) and a second face (25*b*) opposed to the first face (25*a*) and facing the opposite part with respect to the median plane (10') of the wheel, wherein the elastic element (25) extends its thickness between the two faces (25*a*, 25*b*), and wherein each elastic element (25) has a substantially conical, bell or hemispherical shape; and a center of curvature of said first face (25*b*) and said second face (25*a*) lies on the same side of the elastic element (25).

* * * * *